(12) United States Patent
Chen et al.

(10) Patent No.: US 8,935,174 B2
(45) Date of Patent: Jan. 13, 2015

(54) ANALYZING VOYAGE EFFICIENCIES

(75) Inventors: Henry Chen, San Francisco, CA (US);
Philip J. Ballou, Alameda, CA (US);
John R. Murk, El Cerrito, CA (US)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 12/355,152

(22) Filed: Jan. 16, 2009

(65) Prior Publication Data

US 2010/0185471 A1 Jul. 22, 2010

(51) Int. Cl.
*G06Q 10/00* (2012.01)
*G06Q 10/06* (2012.01)
*G06Q 50/30* (2012.01)
*G06Q 10/08* (2012.01)

(52) U.S. Cl.
CPC .............. *G06Q 10/08* (2013.01); *G06Q 10/06* (2013.01); *G06Q 10/0639* (2013.01); *G06Q 50/30* (2013.01)
USPC ................ 705/7.27; 705/7.11; 703/8; 701/21

(58) Field of Classification Search
USPC .............. 701/123, 201, 202, 31.9, 31.1, 33.4; 705/1.1, 7.11, 7.27, 7.36, 7.38, 330; 700/28, 29, 30, 31; 703/7, 8
See application file for complete search history.

(56) References Cited

U.S. PATENT DOCUMENTS

| | | |
|---|---|---|
| 4,812,990 A | 3/1989 | Adams et al. |
| 5,631,640 A | 5/1997 | Deis et al. |
| 6,014,606 A | 1/2000 | Tu |
| 6,085,147 A | 7/2000 | Myers |
| 6,259,988 B1 | 7/2001 | Galkowski et al. |
| 6,269,301 B1 | 7/2001 | Deker |
| 6,285,951 B1 | 9/2001 | Gaskins et al. |
| 6,487,477 B1 | 11/2002 | Woestman et al. |
| 6,615,130 B2 | 9/2003 | Myr |
| 6,691,007 B2 | 2/2004 | Haugse et al. |
| 6,865,476 B1 | 3/2005 | Jokerst, Sr. |
| 6,885,919 B1 | 4/2005 | Wyant et al. |
| 6,898,516 B2 | 5/2005 | Pechatnikov et al. |
| 6,917,860 B1 | 7/2005 | Robinson et al. |
| 7,209,829 B2 * | 4/2007 | Litvack et al. ................ 701/202 |
| 7,243,134 B2 | 7/2007 | Bruner et al. |
| 7,268,703 B1 | 9/2007 | Kabel et al. |

(Continued)

FOREIGN PATENT DOCUMENTS

| | | |
|---|---|---|
| CN | 101344993 A | 1/2009 |
| EP | 1566665 | 8/2005 |

(Continued)

OTHER PUBLICATIONS

King, Koh Kho, et al. "Maneuvering Simulations of Pusher-Barge Systems." Journal of Marine Science and Technology 13.2 (2008): 117-26. ProQuest. Web. Apr. 15, 2013.*

(Continued)

*Primary Examiner* — Michael Harrington
(74) *Attorney, Agent, or Firm* — Yee & Associates, P.C.

(57) ABSTRACT

A method, apparatus, and computer program product are present for analyzing voyage efficiency. Historical data for a completed voyage of a ship is obtained. A baseline voyage solution for a completed voyage is generated with a software application executing on a processor unit using a model of the ship and the historical data. The baseline voyage solution is compared to an actual voyage solution used for the completed voyage to form a comparison.

17 Claims, 8 Drawing Sheets

(56) References Cited

U.S. PATENT DOCUMENTS

| | | | |
|---|---|---|---|
| 7,471,995 B1* | 12/2008 | Robinson | 701/3 |
| 7,680,595 B2* | 3/2010 | Brinton et al. | 701/527 |
| 7,774,133 B2 | 8/2010 | Schwarzmann | |
| 7,778,769 B2 | 8/2010 | Boss et al. | |
| 7,807,734 B2 | 10/2010 | Kim | |
| 7,860,646 B2 | 12/2010 | Bruce et al. | |
| 7,930,102 B2 | 4/2011 | Brent et al. | |
| 7,949,465 B2 | 5/2011 | Bruce et al. | |
| 7,974,774 B2 | 7/2011 | Kumar | |
| 8,108,138 B2 | 1/2012 | Bruce et al. | |
| 8,155,811 B2 | 4/2012 | Noffsinger et al. | |
| 8,180,507 B2 | 5/2012 | Dokken | |
| 2001/0029425 A1 | 10/2001 | Myr | |
| 2002/0188387 A1 | 12/2002 | Woestman et al. | |
| 2003/0236818 A1 | 12/2003 | Bruner | |
| 2005/0256639 A1 | 11/2005 | Aleksic et al. | |
| 2006/0064242 A1 | 3/2006 | Litvack et al. | |
| 2006/0161337 A1 | 7/2006 | Ng | |
| 2006/0241855 A1 | 10/2006 | Joe et al. | |
| 2006/0242108 A1 | 10/2006 | Cuspard et al. | |
| 2007/0064526 A1 | 3/2007 | Holo | |
| 2007/0198178 A1 | 8/2007 | Trimby et al. | |
| 2007/0233364 A1 | 10/2007 | Kumar | |
| 2007/0262855 A1 | 11/2007 | Zuta et al. | |
| 2008/0010006 A1 | 1/2008 | Schwarzmann | |
| 2008/0021132 A1 | 1/2008 | Kim | |
| 2008/0125924 A1 | 5/2008 | Daum et al. | |
| 2008/0125958 A1 | 5/2008 | Boss et al. | |
| 2008/0172172 A1 | 7/2008 | NG | |
| 2008/0249667 A1* | 10/2008 | Horvitz et al. | 701/1 |
| 2008/0255757 A1 | 10/2008 | Bruce et al. | |
| 2008/0312819 A1 | 12/2008 | Banerjee | |
| 2009/0063032 A1 | 3/2009 | Das | |
| 2009/0141587 A1 | 6/2009 | Welker et al. | |
| 2009/0161797 A1 | 6/2009 | Cowles et al. | |
| 2009/0271054 A1 | 10/2009 | Dokken | |
| 2010/0088011 A1 | 4/2010 | Bruce et al. | |
| 2010/0094496 A1 | 4/2010 | Hershkovitz et al. | |
| 2010/0152998 A1 | 6/2010 | Schwarzmann | |
| 2010/0168942 A1 | 7/2010 | Noffsinger et al. | |
| 2010/0174484 A1 | 7/2010 | Sivasubramaniam et al. | |
| 2010/0280750 A1 | 11/2010 | Chen et al. | |
| 2011/0257819 A1 | 10/2011 | Chen et al. | |
| 2011/0270654 A1 | 11/2011 | Banerjee | |

FOREIGN PATENT DOCUMENTS

| | | | |
|---|---|---|---|
| EP | 1566665 A1 | | 8/2005 |
| FR | 2760282 A1 | | 9/1998 |
| GB | 2396729 A | | 6/2004 |
| JP | 01187611 | | 7/1989 |
| JP | 10307042 | | 11/1998 |
| JP | 2007057499 | | 3/2007 |
| WO | WO2004061737 | | 7/2004 |
| WO | WO2004066236 | A1 | 8/2004 |
| WO | WO2004097341 | | 11/2004 |
| WO | WO2008029221 | A2 | 3/2008 |
| WO | WO2008096376 | A1 | 8/2008 |
| WO | WO2010008363 | A1 | 1/2010 |
| WO | WO2010082989 | A2 | 7/2010 |

OTHER PUBLICATIONS

Teti et al., "Sun-Synchronous Lunar Polar Rover as a First Step to Return to the Moon", Proceedings ISAIRAS 2005 Conference, Munich, Germany, Sep. 2005, pp. 1-8 http://tim.barfoot.googlepages.com/teti_isairas05.pdf.

Avnet et al., "Lunar Telescope Facility Final Design Report", MIT Aeronautics and Astronautics, 2007, 7 pages of table of contents with full article at: http://ocw.mit.edu/NR/rdonlyres/Aeronautics-and-Astronautics/16-89JSpring-2007/EO0C807D-5D9C-47EC-A8AF-019708EFD1CA/0/report.pdf.

"Mars Autonomy Project Path Planning", 1999, pp. 1-3 http://www.frc.ri.cmu.edu/projects/mars/dstar.html.

Bradley et al., "Preliminary Cocnepts for a long-range Mars Rover Navigation System Prototype based on a Mars Global Terrain Database", Research Report No. 2001-695-18, Department of Computer Science, University of Calgary, Calgary Canada, pp. 1-9 architecture:http://dspace.ucalgary.ca/bitstream/1880/46267/2/2001-695-18.pdf.

Team MCNAV, "DARPA Lunar Grand Challenge 2005—MBARS", MCNAV System & Software Architecture (SSA), Carnegie Mellon University, Jul. 2005, pp. 1-11.

Thrun et al., "Stanley: The Robot that Won the DARPA Grand Challenge", Journal of Field Robotics 23(9) pp. 661-692, 2006.

U.S. Appl. No. 12/244,291, filed Oct. 2, 2008, Bruce et al.

PCT International Search Report for PCT/US09/67375 dated Aug. 4, 2010.

Chen et al., "Use of Operation Support Information Technology to Increase Ship Safety and Efficiency", SNAME Transactions, vol. 106, 1998, pp. 105-127.

Chen, "Weather Routing: A New Approach", Ocean Systems, Inc., pp. 1-5, retrieved Nov. 24, 2008 http://www.ocean-systems.com/papers.htm.

USPTO office action for U.S. Appl. No. 11/735,831 dated Jun. 28, 2010.

USPTO office action for U.S. Appl. No. 12/244,291 dated May 27, 2011.

Wettergreen et al., "Robotic Planetary Exploration by Sun-Synchronous Navigation", Jun. 2001, Carnegie Mellon University, pp. 1-8.

"AIS Explained", SRT Marine Technology, pp. 1-3, retrieved Mar. 17, 2010 www.srt-marine.com/products-explained.php.

"AIS Guidelines, Recommendations, and Standards" 1 page, retrieved Mar. 17, 2010 www.navcen.uscg.gov/enav/ais/AIS_standards.htm.

"AIS Overview", Navigation Center, 1 page, retrieved Mar. 17, 2010 www.navcen.uscg.gov/enav/ais/.

"An Iridium Story of never Say Die", Satnews Daily, pp. 1-3, retrieved Mar. 17, 2010 www.satnews.com/cgi-bin/story.cgi?number=309555710.

"Andrie Implements FuelTrax", press release, Mar. 9, 2009, FuelTrax Marine Fuel Management, 1 page.

"Annex 1—Guidance on the Use of AIS Application Specific Messages", IMO AIS Binary Message Correspondence Group, Revision of the Guidance on the Application of AIS Binary Messages, Report from the AIS Binary Messages Correspondence Group, Submitted by Sweden, IMO NAV 55 conference, Jul. 2009 vislab-ccom.unh.edu/~schwehr/.../2009-Nav55-CG-AIX-Report-Annex1.pdf.

Dijkstra, "A Note on Two Problems in Connexion with Graphs," Numerische Mathematik, vol. 1, 1959, pp. 269-271, 3 Pages.

"Electronic purchasing—a ship supplier speaks", Digital Ship, Apr. 2006, pp. 1-28.

"Fleet Tracking, Iridium Satellite Communication", Blue Sky Network, 1 page, retrieved Mar. 17, 2010 www.blueskynetwork.com/AboutUs/AboutUs.php.

Hinnenthal "Robust Pareto—Optimum Routing of Ships Utilizing Deterministic and Ensemble Weather Forecases," Berlin University of Technology, approved dissertation for Doctor of Engineering Sciences, Mar. 2008, 149 Pages.

"How AIS Ship Tracking Works", The AIS System, BoatingSF.com, retrieved Mar. 17, 2010, 1 page www.boatingsf.com/ais_explain.php.

Iridium Maritime News Brief, Jun. 2009, pp. 1-4, retrieved Mar. 17, 2010 www.bsl.com/extranet/Iridium/21435_Iridium_newsletter.

"Mobile Data Satellite News Brief", iridium, Mar. 2009 pp. 1-2 http://investor.iridium.com/releasedetail.cfm?ReleaseID=429160.

"Nobeltec Admiral MAX Pro Navigation Software a Comprehensive Solution for Serious Recreational Yachting", Jeppesen Marine, Portland Oregon, May 2008, 1 page, retrieved Mar. 17, 2010 www.jeppesen.com/company/newsroom/articles.

"Tender Tracker Plus Pack", nobeltec.com, Jeppesen Marine, Aug. 2008, pp. 1-2.

USPTO notice of allowance dated Oct. 5, 2011 regarding U.S. Appl. No. 12/244,291, 15 Pages.

Response to office action dated Aug. 23, 2011 regarding U.S. Appl. No. 12/244,291, 21 Pages.

(56) References Cited

OTHER PUBLICATIONS

USPTO notice of allowance dated Jan. 28, 2011 regarding U.S. Appl. No. 12/872,801, 4 Pages.
Response to final office action dated Jan. 21, 2011 regarding U.S. Appl. No. 12/872,801, 8 Pages.
USPTO final office action dated Jan. 10, 2011 regarding U.S. Appl. No. 12/872,801, 4 Pages.
Response to office action dated Dec. 8, 2010 regarding U.S. Appl. No. 12/872,801, 15 Pages.
USPTO non-final office action dated Sep. 29, 2010 regarding U.S. Appl. No. 12/872,801, 10 Pages.
Preliminary amendment dated Aug. 31, 2010 regarding U.S. Appl. No. 12/872,801, 9 Pages.
USPTO notice of allowance dated Sep. 1, 2010 regarding U.S. Appl. No. 11/735,831, 8 Pages.
Response to office action dated Jul. 29, 2010 regarding U.S. Appl. No. 11/735,831, 11 Pages.
International search report dated Aug. 9, 2011 regarding application GB1106488.8, conducted by UK searching authority 7 Pages.
Chen et al., "Remote Sensing and Determination of Tactical Ship Readiness", U.S. Appl. No. 12/762,003, filed Apr. 16, 2010, 60 Pages.
Bruce et al., "Vessel Routing System", U.S. Appl. No. 13/297,831, filed Nov. 16, 2011, 82 Pages.
Final Office Action, dated Feb. 8, 2013, regarding U.S. Appl. No. 12/762,003, 21 pages.
Final Office Action, dated Jan. 10, 2013, regarding U.S. Appl. No. 12/762,100, 21 pages.
Office Action dated Jul. 25, 2012 regarding U.S. Appl. No. 12/762,003, 29 pages.
Office Action dated Jul. 12, 2012 regarding U.S. Appl. No. 12/762,100, 28 pages.
Office Action dated Nov. 11, 2012 regarding U.S. Appl. No. 13/297,831, 24 pages.
EP search report dated Mar. 1, 2013 regarding application 12182388.4, reference 1284P457EP MW, applicant The Boeing Company, 6 pages.
EP search report dated Aug. 26, 2013 regarding application 09802064.7-1955/2389592 PCT/US2009067375, reference P52172EP-K/RGBH, applicant The Boeing Company, 6 pages.
Office Action, dated May 20, 2014, regarding U.S. Appl. No. 13/297,831, 42 pages.
Final Office Action, dated May 20, 2014, regarding U.S. Appl. No. 13/297,831, 42 pages.

\* cited by examiner

ANALYZING VOYAGE EFFICIENCIES

BACKGROUND INFORMATION

1. Field

The present disclosure relates generally to ship operations and, in particular, to a method and apparatus for analyzing ship performance. Still more particularly, the present disclosure provides a computer implemented method, apparatus, and computer usable program code for analyzing and comparing a ship's voyage efficiency while traveling between an origination point and a destination point.

2. Background

Commercial vessels carry cargo, goods, passengers, and/or materials from one port to another. Commercial vessels may include, for example, tankers, bulk carriers, container vessels, and passenger vessels. Globally, tens of thousands of vessels make voyages over the seas from one port to another port. A typical cargo vessel may make anywhere from 10 to 30 voyages per year. Often, at any one time, 1,000 to 3,000 commercial vessels are at sea.

Issues may occur when a ship arrives at a destination later than scheduled. For example, the availability of a planned berth and a port may be missed. As a result, the ship may have to wait additional time for another berth. Further, scheduling of dockside labor facilities also may be disrupted by a ship arriving to a destination later than scheduled. Connections also may be missed as well as delivery of products to a vendor being delayed. These types of issues may increase costs in transporting cargo on a ship.

By increasing the speed of a ship to arrive early, the ship may still have to wait for a scheduled berth at a port. Further, fuel efficiency may be decreased by the increased speed with an early arrival. In some cases, the ship may arrive on time but may require bursts of speed that may also reduce fuel efficiency. These situations also increase the costs needed to make a voyage.

In making a voyage, it is desirable to make the voyage in a manner that enhances safety, efficiency, and/or lower fuel consumption. Weather forecasts, historical data, charts, and optimization software applications are currently used to generate routes to meet these and/or other goals with respect to a ship making a voyage. These types of processes, however, rely on weather forecasts. The weather forecasts, however, become less accurate when the forecast is farther out in time.

It may be difficult to identify a solution that may provide the best results for a particular ship. Identifying a solution that provides the best efficiency for a ship may decrease the cost to make a voyage. In addition, a better solution also may increase the occurrences of on time arrivals as well as the possibility of reducing disruptions at a port.

Therefore, it would be advantageous to have a method and apparatus that addresses one or more of the issues discussed above.

SUMMARY

In one advantageous embodiment, a method is present for analyzing voyage efficiency. Historical data for a completed voyage of a ship is obtained. A baseline voyage solution for a completed voyage is generated with a software application executing on a processor unit using a model of the ship and the historical data. The baseline voyage solution is compared to an actual voyage solution used for the completed voyage to form a comparison.

In another advantageous embodiment, a data processing system comprises a storage device having program code stored thereon, and a processor unit in communication with the storage device. The processor unit executes the program code to obtain historical data for a completed voyage of a ship. The processor unit further executes the program code to generate a baseline voyage solution for the completed voyage with a software application executing on a processor unit using a model of the ship and the historical data. The processor unit further executes the program code to compare the baseline voyage solution to an actual voyage solution used for the completed voyage to form a comparison.

In yet another advantageous embodiment, a computer program product for analyzing voyage efficiency comprises a computer recordable storage medium and program code stored on the computer recordable storage medium. Program code may be present for obtaining historical data for a completed voyage of a ship. Program code may also be present for generating a baseline voyage solution for the completed voyage with a software application executing on a processor unit using a model of the ship and the historical data. Further, program codes may be present for comparing the baseline voyage solution to an actual voyage solution used for the completed voyage to form a comparison.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
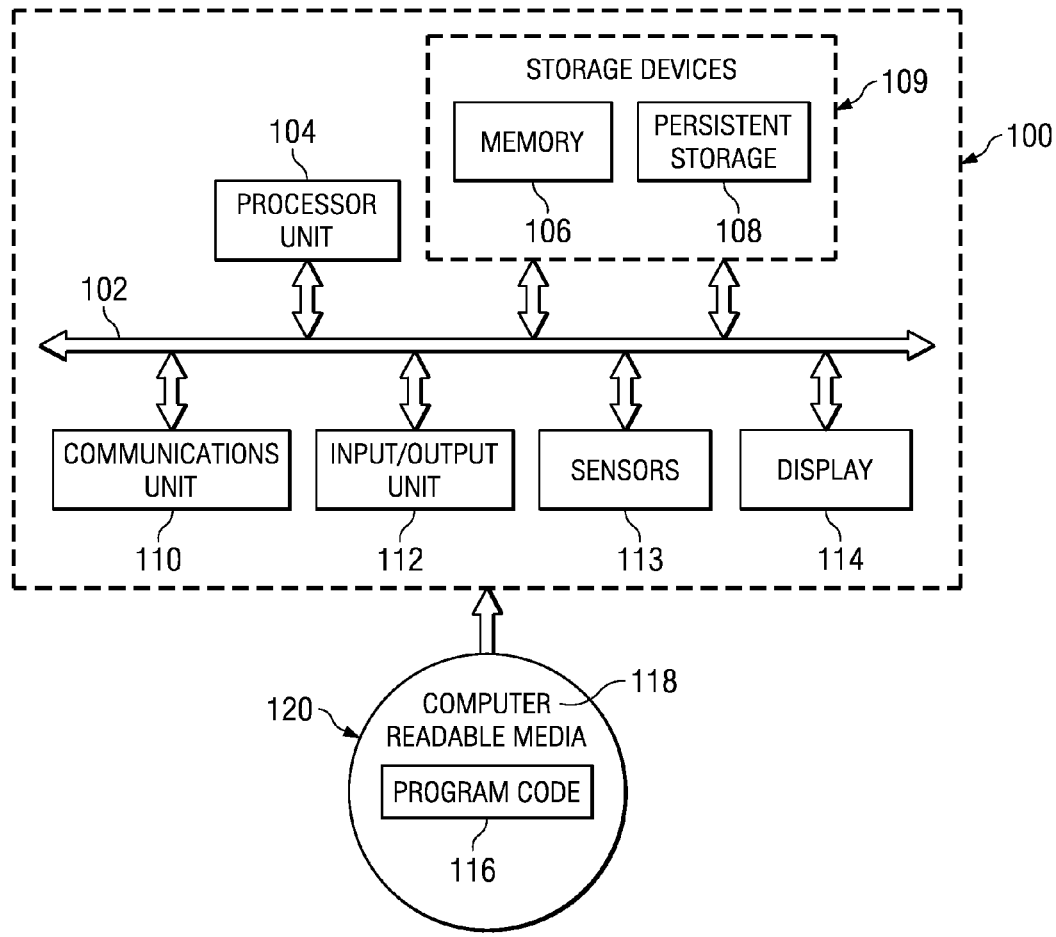
FIG. 1 is a diagram of a data processing system in accordance with an advantageous embodiment.

With reference now to the figures and, in particular, with reference to FIG. 1, a diagram of a data processing system is depicted in accordance with an advantageous embodiment. Data processing system 100 is an example of a data processing system that may be used to implement different advantageous embodiments. Data processing system 100 may be located on a ship, in a home office, and/or some other suitable location. Data processing system 100 may implement processes needed to analyze voyage efficiency in accordance with one or more of the different advantageous embodiments.

In this illustrative example, data processing system 100 includes communications fabric 102, which provides communications between processor unit 104, memory 106, persistent storage 108, communications unit 110, input/output (I/O) unit 112, sensors 113, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 109. A storage device is any piece of hardware that is capable of storing information such as, for example, without limitation, data, program code in functional form, and/or other suitable information either on a temporary basis and/or a permanent basis. Memory 106, in these examples, may be, for example, a random access memory or any other suitable volatile or non-volatile storage device.

Persistent storage 108 may take various forms, depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Another example is the use of sensors 113. Sensors 113 may be specialized sensors such as, for example, multi-axis motion monitors. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 and may be loaded onto or transferred to data processing system 100 for execution by processor unit 104. Program code 116 and computer readable media 118 form computer program product 120 in these examples. Computer readable media 118 is also an example of a storage device. Processor unit 104 may be in communication with the storage device to execute program code 116. Processor unit 104 may be in communication with a storage device using communications fabric 102.

In one example, computer readable media 118 may be in a tangible form such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive or a flash memory that is connected to data processing system 100. The tangible form of computer readable media 118 is also referred to as computer recordable storage media.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated in data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 118 are examples of storage devices in a tangible form. In yet another example, a bus system may be used to implement communications fabric 102 and may be comprised of one or more buses, such as a system bus or an input/output bus.

Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache, such as found in an interface and memory controller hub that may be present in communications fabric 102.

The different advantageous embodiments recognize and take into account that an ability to analyze or evaluate software used to plan voyages would be useful. The different advantageous embodiments recognize and take into account that with a capability to analyze software used to plan voyages, the analysis may be used to improve and/or refine this type of software. In other words, the different advantageous embodiments recognize and take into account that it would be desirable to have a capability to analyze how well software for voyage optimization performs, as well as how well a voyage is optimized given changing conditions.

The different advantageous embodiments may provide a method and apparatus for analyzing voyage efficiency. Historical data may be obtained for a completed voyage of a ship. A baseline voyage solution may be generated for the completed voyage with a software application executing on a processor unit using a model of the ship and the historical data. The baseline voyage solution may be compared to an actual solution used for the completed voyage to form a comparison. With this information, one or more of the different advantageous embodiments may be able to analyze the performance of the software application, as well as possibly identify improvements. Further, the different advantageous embodiments may be used to compare different software applications to identify one or more applications that may provide some desired level of performance.

Figure 2:
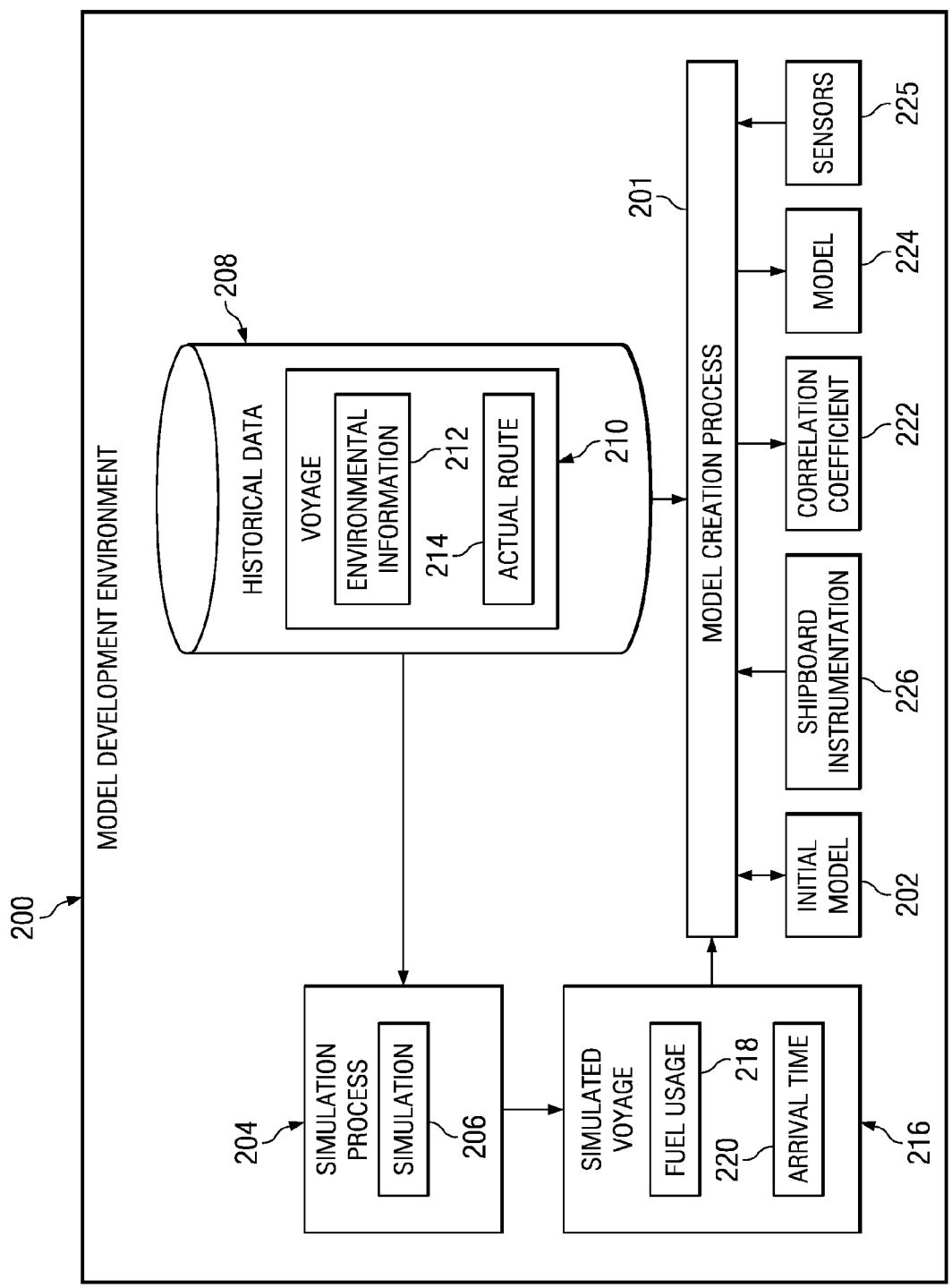
FIG. 2 is a diagram of a model development environment in accordance with an advantageous embodiment.

With reference now to FIG. 2, a diagram of a model development environment is depicted in accordance with an advantageous embodiment. Model development environment 200 may be implemented using one or more data processing systems such as, for example, data processing system 100 in FIG. 1. Model development environment 200 may begin with initial model 202. Model creation process 201 may be used to create initial model 202. In these illustrative examples, initial model 202 may be a model of a ship.

Initial model 202 is a model that may be used to perform simulations and/or generate voyage solutions for the ship. A voyage solution, as used herein, is a plan for a ship to travel from an origination point to a destination. The plan may include, for example, without limitation, at least one of a number of speeds, a number of directions, and/or other relevant factors for performing the voyage. The voyage solution may be static or may change while the voyage occurs.

Model creation process 201 may change initial model 202 to increase the accuracy of a simulation of a ship. Models, such as initial model 202, may incorporate detailed ship-specific data. This ship-specific data may include, for example, ship hull shape, appendages, such as bilge keels and stabilization fins, engine power characteristics, propeller curves, sea-keeping models, user-defined safe operating limits, ship draft and trim, metacentric height, and available trial and other test and/or voyage data. Optional onboard sensors improve model accuracy through adaptive learning processes.

In these illustrative examples, simulation process 204 may perform simulation 206 with initial model 202. Jeppesen's Voyage and Vessel Optimization Solution (VVOS) is one such simulation application. Simulation 206 also uses historical data 208 in these illustrative examples. Historical data may be obtained for a previously completed voyage for the ship. For example, historical data 208 may contain information about voyage 210. Historical data 208 may include environmental information 212 for voyage 210. In these examples, voyage 210 is a completed voyage. Environmental information 212 may include, for example, without limitation, weather conditions, wave heights, currents, and/or other relevant environmental information that was present during voyage 210.

This environmental information may be, for example, a hindcast. A hindcast is an accurate historical record of weather. Hindcast wind and waves are the analytical predictions of wind velocity and direction and wave height, speed, and direction generated using state-of-the-art numerical models based on forecast or recorded weather data and verified by physical data. This data may be obtained from Oceanweather Inc. in these examples.

The weather information may include, for example, without limitation, surface wind velocities and directions; wave heights, velocities, and directions; surface current velocities and directions; and other relevant information. Historical data 208 also may include actual route 214 for voyage 210. This data also may include recorded weather data. Recorded weather data is the actual recorded weather data and may have the same types of information as the weather forecast. Real-time data may be included with the use of onboard sensors 225 and interfaces to existing shipboard instrumentation 226. Environmental information also may include current data. Current data is, for example, without limitation, the tidal and/or major ocean current directions, routes and velocities. This data is obtained from sources other than the weather and/or hindcast data.

Simulation process 204 may perform simulation 206 using environmental information 212 and actual route 214 to create simulated voyage 216. Simulated voyage 216 contains results from simulation 206. For example, simulated voyage 216 may include at least one of fuel usage 218, arrival time 220, and/or other relevant information. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Simulated voyage 216 may be compared to voyage 210 by model creation process 201. The comparison of simulated voyage 216 to voyage 210 may include comparing information such as, for example, fuel usage 218 and arrival time 220 to corresponding information within historical data 208 for voyage 210.

Model creation process 201 may generate correlation coefficient 222 from the comparison of simulated voyage 216 to voyage 210, which is an actual voyage in the illustrative examples. Correlation coefficient 222 may be used to change initial model 202. For example, correlation coefficient 222 may be used to adjust initial model 202 to match the actual recorded ship performance. The performance of the ship may be, for example, without limitation, at least one of fuel efficiency, speed, and probability of arriving on time at the destination.

Correlation coefficient 222 may also be adjusted for changes such as, for example, modifications made to the ship hull design, changes in hull or propeller roughness, fuel quality, or use of different hull coating materials. Further, correlation coefficient 222 may also be used to correct the model for missing or erroneous data. Correlation coefficient 222 may be readjusted as additional data is collected for the ship performance. The additional data may be collected from the interfacing with sensors and/or shipboard instrumentation and/or after maintenance or repair.

For example, the correlation coefficient for hull roughness can be expressed in terms of a propeller wake factor. Assuming the propeller has not been damaged, there is a fixed relationship between shaft horsepower, ship speed, and engine revolutions per minute. This relationship follows the propeller curve, including the wake factor. Using measured data on shaft horsepower, speed, and revolutions per minute, one can derive the wake factor.

When a ship is new, the propeller wake factor may range from around 20 percent to around 25 percent. As the hull condition worsens due to fouling, the propeller wake factor may increase to over 40 percent. This change may result in increased true slip, which requires increased horsepower for the same ship speed. The increased propeller wake factor can be updated in the performance model to investigate the return on investments on propeller polishing to reduce the wake factor, required horsepower, and fuel consumption based on the ship's future voyages.

In these examples, multiple correlation coefficients, such as correlation coefficient 222, may be identified by model creation process 201 to generate and/or modify model 224. Multiple coefficients, such as correlation coefficient 222, are used to calibrate the model simulation results to match the actual measured voyage performance. Coefficients can be used, for example, to correct for resistance errors due to hull or propeller roughness, differences in draft, trim, or modifications to the ship, engine state-of-tune, and/or fuel quality.

After these changes are performed, additional simulations may be run using simulation 206 to simulate a voyage using changes to initial model 202. These additional simulations may be performed using voyage 210 and other completed voyages for a ship. These simulations, comparisons, and changes may be performed repeatedly until simulated voyage 216 corresponds to voyage 210 within a desired accuracy level. When simulations are complete, model creation process 201 may then form model 224.

Model 224 may be used to identify voyage solutions and/or perform comparisons in accordance with one or more advantageous embodiments. Sea-keeping and speed-keeping models are examples of types of models that may be used to implement model 224. These models are well known by naval architects, such as those found in Principles of Naval Architecture, Society of Naval Architects and Marine Engineers (SNAME), ISBN 0-939773-00-7(I), 0-939773-01-5(II), and 0-939773-02-3(III).

Figure 3:
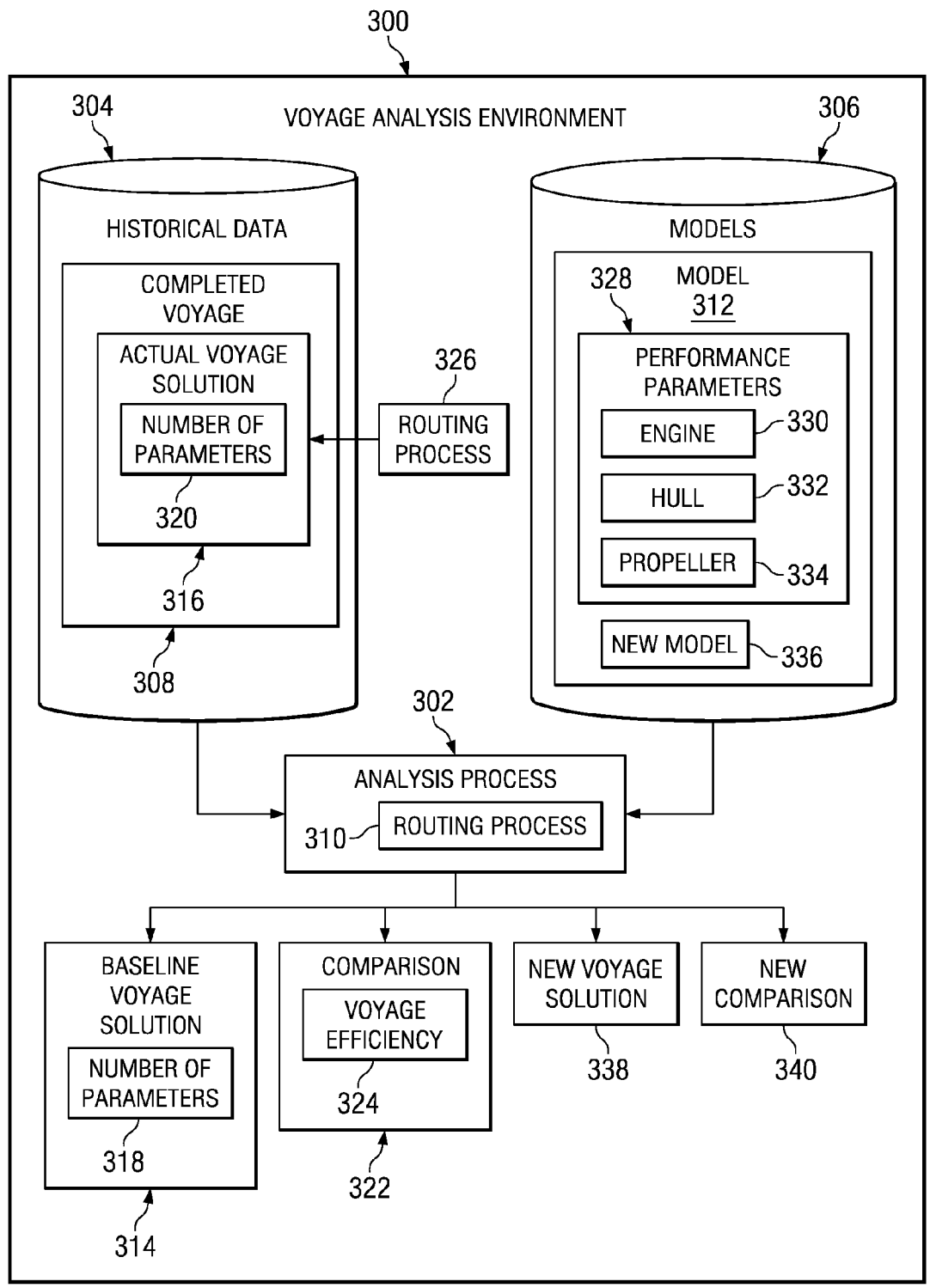
FIG. 3 is a diagram of a voyage analysis environment in accordance with an advantageous embodiment.

With reference now to FIG. 3, a voyage analysis environment is depicted in accordance with an advantageous embodiment. In this example, voyage analysis environment 300 may be implemented using one or more data processing systems, such as data processing system 100 in FIG. 1.

In this illustrative example, analysis process 302 within voyage analysis environment 300 may use historical data 304 and models 306 to perform analysis of voyages. For example, completed voyage 308 in historical data 304 may be obtained by analysis process 302. Historical data 304 may contain information similar to historical data 208 in FIG. 2.

Historical data 304 may include, for example, without limitation, environmental information recorded during the time period of the voyage for the locations through which the voyage passed, the actual route for the voyage, and other relevant information. The environmental information may include, for example, without limitation, weather conditions, wave heights, currents, and other relevant environmental information. In these examples, this environmental information may take the form of a hindcast.

Completed voyage 308 contains historical data for a voyage that has been completed by a ship. Routing process 310 in analysis process 302 may generate baseline voyage solution 314 using historical data for completed voyage 308 and model 312. An example of a software application that may be used to implement routing process 310 is Jeppesen's Vessel and Voyage Optimization Solution (VVOS), which may be available from Jeppesen, which is a Boeing company. Model 312 is a model within models 306 for the ship that generated historical data 304 for completed voyage 308.

Baseline voyage solution 314 may be compared to actual voyage solution 316 in historical data 304 for completed voyage 308. In these illustrative examples, actual voyage solution 316 may be the actual plan followed for completed voyage 308. Actual voyage solution 316 may be generated manually or using a routing process such as, for example, routing process 326.

Analysis process 302 may compare number of parameters 318 in baseline voyage solution 314 to number of parameters 320 in actual voyage solution 316. A number, as used herein, refers to one or more items. For example, number of parameters 318 is one or more parameters. Number of parameters 318 may be parameters generated by analysis process 302 in forming baseline voyage solution 314. Number of parameters 320 may be generated from completed voyage 308.

In these examples, number of parameters 318 and number of parameters 320 may take the form of performance parameters. These parameters may include, for example, without limitation, fuel consumption, speed, arrival time, and/or other relevant parameters identifying performance for a voyage.

Number of parameters 320 is selected to correspond to number of parameters 318 in these examples. The comparison of number of parameters 318 and number of parameters 320 may result in comparison 322. Comparison 322 may include voyage efficiency 324. Voyage efficiency 324 may identify efficiency for number of parameters 318 and number of parameters 320 in comparison 322.

Voyage efficiency 324 may be expressed as the ratio of the minimum possible amount of fuel consumed by a ship given a specific set of constraints or parameters to the actual amount of fuel consumed by the same ship given the same set of constraints or parameters. In these examples, 100 percent voyage efficiency is when the amount of fuel actually consumed is the same as the minimum possible amount of fuel consumed. A lower percentage indicates a less than optimum efficiency. In other words, more fuel is actually consumed than the minimum possible amount of fuel.

For example, if a parameter in the parameters being compared is fuel usage, voyage efficiency 324 may be calculated as follows:

$$V_\eta = \Sigma O_\eta = \Sigma(E_\eta \times P_\eta \times H_\eta) = \text{Optimized/Actual Consumed Fuel}$$

where, $V_\eta$ is voyage efficiency, $O_\eta$ is operating efficiency, $E_\eta$ is engine efficiency, $P_\eta$ is propeller efficiency, and $H_\eta$ is hull efficiency. $E_\eta$, $P_\eta$ and $H_\eta$ are typically monitored by existing shipboard instrumentation. If instrumentation is not present on a ship, additional sensors may be installed. $E_\eta$ can be measured by monitoring fuel consumption in relation to output shaft torque and revolutions per minute (RPM).

This fuel consumption may be, for example, in terms of shaft horsepower (SHP). $P_\eta$ can be measured by monitoring revolutions per minute relative to shaft horsepower and speed. $H_\eta$ can be measured by monitoring ship speed in relation to shaft horsepower. The $O_\eta$ is the sum of all of the different engine, propeller, and hull efficiencies for a given segment of a given voyage. The overall $V_\eta$ is the product of all operating efficiencies for each segment of a given voyage from origination to destination.

A voyage efficiency of 100 percent represents a perfectly optimized voyage. In other words, a 100 percent voyage efficiency occurs when the amount of fuel actually consumed is the same as the minimum amount of fuel that should be consumed for the voyage. A voyage efficiency of less than 100 percent indicates a lower than optimum voyage. A lower percentage indicates a less than optimum efficiency, in these examples. For example, more fuel may be actually consumed than the minimum amount of fuel that should be consumed.

An optimum baseline voyage is the route, speed, and direction of a simulated voyage for a ship that offers the maximum voyage efficiency. This efficiency may be, for example, minimum fuel consumption, given the same departure and arrival times, origination and destination, load, draft, trim, and other constraints as the ship performing an actual voyage.

In these examples, the parameters used may include, for example, without limitation, the different parameters in a ship model. These parameters may be, for example, without limitation, hull shape; hull coatings; propeller design; hull and propeller roughness; draft; trim; engine performance; sea keeping, speed keeping, and safe operating limits; origination and destination; departure and arrival times; geographical limits; ocean conditions for weather, waves, and currents; special storm warnings; and/or other relevant parameters.

In this manner, the different advantageous embodiments provide a capability to determine how much fuel was used in actual voyage solution 316 as compared to baseline voyage solution 314. For example, actual voyage solution 316 may have been generated by routing process 326. In this manner, a comparison between routing process 310 and routing process 326 may be performed in a manner that allows an identification of which routing process may be an ideal or better routing process for performing routing for a particular ship.

Further, the different advantageous embodiments also may be used to make improvements on existing ships. For example, analysis process 302 may modify performance parameters 328 in model 312 to determine whether increased efficiencies may occur. Performance parameters 328 may include, for example, engine 330, hull 332, propeller 334, and/or other relevant parameters.

For example, hull 332 may be adjusted to take into account repainting of the hull of a ship. Propeller 334 may be adjusted to take into account a different propeller, adding a number of new propellers, varying pitch, and/or polishing of a current propeller. Engine 330 may be altered to take into account maintenance on an engine, improvements to an engine, or other modifications.

These changes may form new model 336. New model 336 may then be used with completed voyage 308 in historical data 304 to generate new voyage solution 338. New voyage solution 338 may then be compared to baseline voyage solution 314 and/or actual voyage solution 316 to form new comparison 340. Analysis process 302 may analyze new comparison 340 and comparison 322 to determine whether the modifications for new model 336 provide better performance for the ship. If sufficient increases in performance are identified, changes in new model 336 may be implemented in the actual ship for new model 336.

In these examples, routing process 310 may generate voyage solutions for a voyage from an origination point to a destination point with fixed transit duration. For example, the departure and arrival time may be fixed. A theoretical optimum passage that maximizes advantages of winds, waves, current, and other environmental conditions with respect to ship performance may be identified in a manner that minimizes fuel consumption while meeting the constraints of the departure and arrival times.

Routing process 310 may find an optimum voyage solution by creating a grid or number of possible solutions following within the constraints. This routing process may compare each leg of the grid for minimum fuel consumption. The parameters considered by routing process 310 may include, for example, without limitation, ship hull design, engine power characteristics, propeller curves, ship draft, safe operating limits, and/or other relevant parameters.

One or more of the different advantageous embodiments may use voyage analysis environment 300 to provide a capability to benchmark or compare voyage solutions generated by different routing processes. For example, the comparisons of routing solutions generated by routing process 310 may be compared to those generated by routing process 326.

In these examples, routing process 326 generates actual voyage solution 316 for completed voyage 308. Routing process 310 may then create baseline voyage solution 314 from historical data 304 for completed voyage 308. Analysis process 302 may compare these voyage solutions to generate voyage efficiency 324. In these illustrative examples, voyage efficiency 324 may be used to identify which routing process provides a better routing solution. This type of comparison may be formed with many different types of routing processes to identify a particular routing process that may provide better routing solutions as compared to other routing processes.

Figure 4:
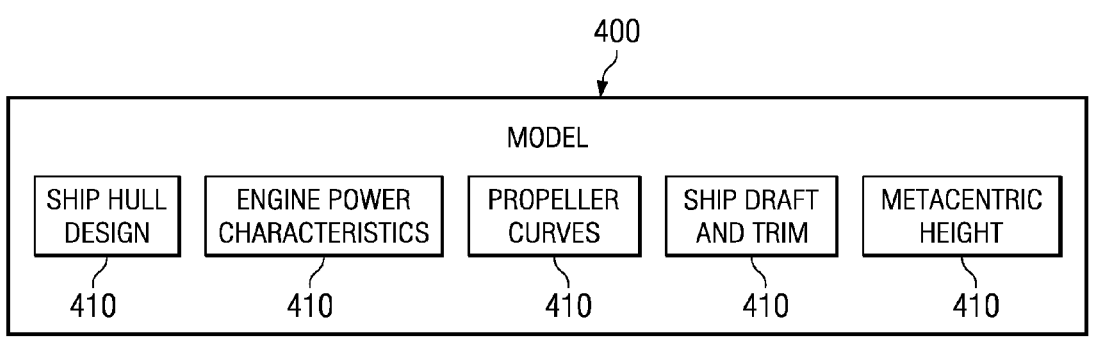
FIG. 4 is a diagram of a model of a ship in accordance with an advantageous embodiment.

Turning now to FIG. 4, a diagram of a model of a ship is depicted in accordance with an advantageous embodiment. In this example, model 400 is an example of a model that may be found in model development environment 200 and/or voyage analysis environment 300. For example, model 400 may be used to implement initial model 202, model 224, model 312, and new model 336.

Model 400 contains information about a ship and may be used to simulate performance of the ship. Model 400 may include, for example, ship hull design 402, engine power characteristics 404, propeller curves 406, ship draft and trim 408, metacentric height 410, and/or other relevant information.

Engine power characteristics 404 may be used to identify engine efficiencies for the ship. Propeller curves 406 may be used to identify propeller efficiency. Ship hull design 402, ship draft and trim 408, and metacentric height 410 may be used to identify hull efficiencies for the ship. These different efficiencies may be combined to form the operating voyage efficiency for a ship when model 400 is used by a routing process or other simulation tool.

Figure 5:
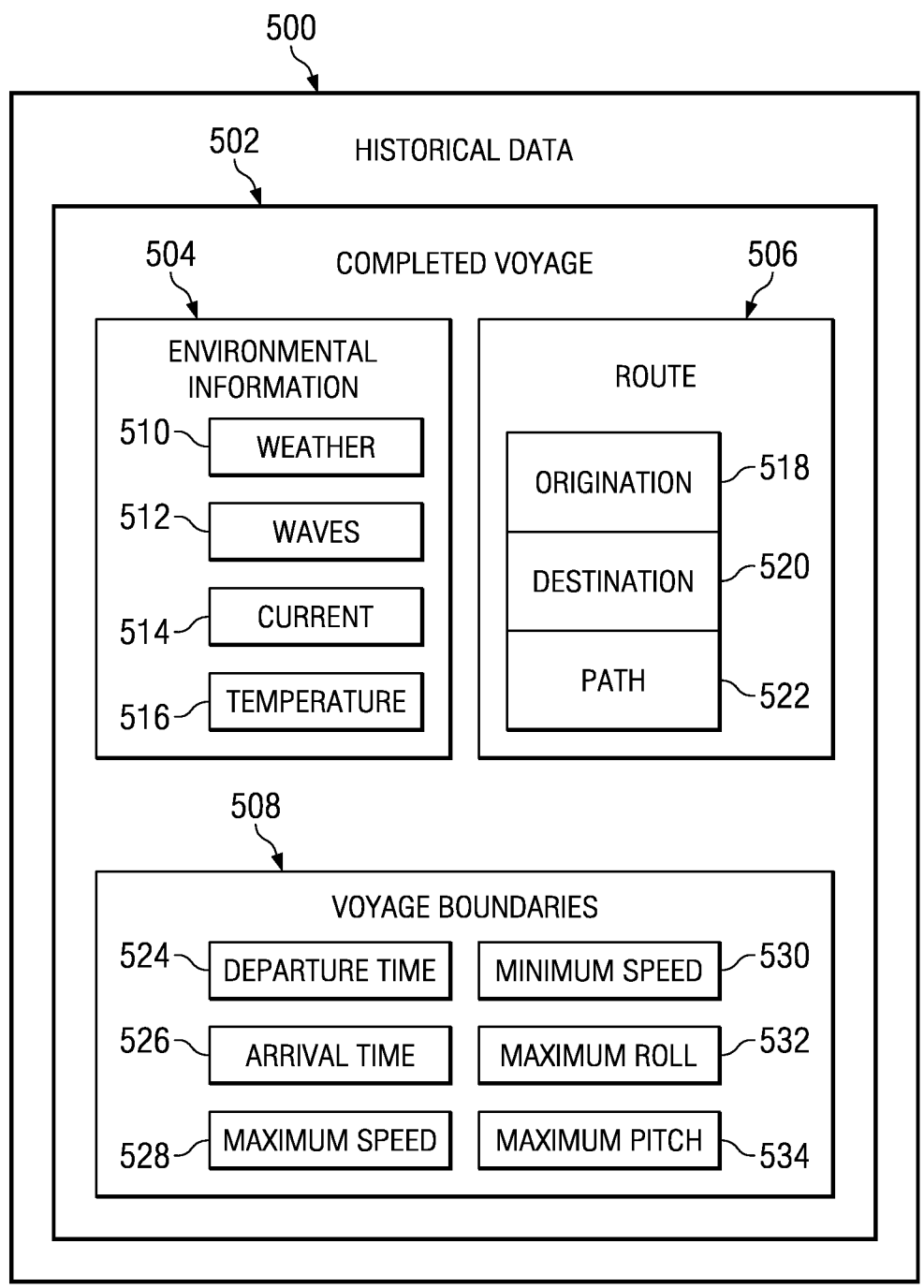
FIG. 5 is a diagram illustrating historical data in accordance with an advantageous embodiment.

With reference now to FIG. 5, a diagram illustrating historical data is depicted in accordance with an advantageous embodiment. Historical data 500 contains data for completed voyage 502.

Completed voyage 502 may include data such as, for example, environmental information 504, route 506, and voyage boundaries 508. Environmental information 504 is information for the same period of time during which completed voyage 502 occurred. Environmental information 504 may include, for example, without limitation, weather 510, waves 512, current 514, temperature 516, and/or other relevant environmental information present during the performance of completed voyage 502.

Route 506 may include, for example, without limitation, origination 518, destination 520, and path 522 between origination 518 and destination 520. Voyage boundaries 508 are boundaries or constraints to the manner in which the ship operates and/or moves. For example, without limitation, voyage boundaries 508 may include departure time 524, arrival time 526, maximum speed 528, minimum speed 530, maximum roll 532, maximum pitch 534, and other relevant boundaries.

Constraints are limitations and/or specifications for a voyage. Constraints may be, for example, without limitation, parameters used in the ship model, such as hull shape, hull coatings, propeller design, hull and propeller roughness, draft, trim, engine performance, sea-keeping and speed-keeping limits, safe operating limits, origination and destination, departure and arrival times, geographical limits, ocean conditions for weather, ocean conditions for waves, conditions for ocean and tidal currents, special storm warnings, and other relevant information.

The illustrations of model development environment 200 in FIG. 2, voyage analysis environment 300 in FIG. 3, model 400 in FIG. 4, and historical data 500 in FIG. 5 are not meant to imply physical and/or architectural limitations to the manner in which different advantageous embodiments may be implemented. Some advantageous embodiments may include other components in addition to, or in place of, the ones illustrated. Further, in some advantageous embodiments, some of the components may be unnecessary.

For example, model development environment 200 in FIG. 2 may be executed on the same data processing system as voyage analysis environment 300 in FIG. 3 in some examples. In yet other illustrative embodiments, these different environments may be distributed over a number of different data processing systems that may be connected to each other through a communications medium, such as a network. As yet another example, in some advantageous embodiments, additional routing processes may be compared or benchmarked in addition to the two illustrated in voyage analysis environment 300 in FIG. 3. Further, the different models, such as initial model 202 in FIG. 2, model 224 in FIG. 2, and model 312 in FIG. 3, are models representing actual physical ships or designs for ships.

Figure 6:
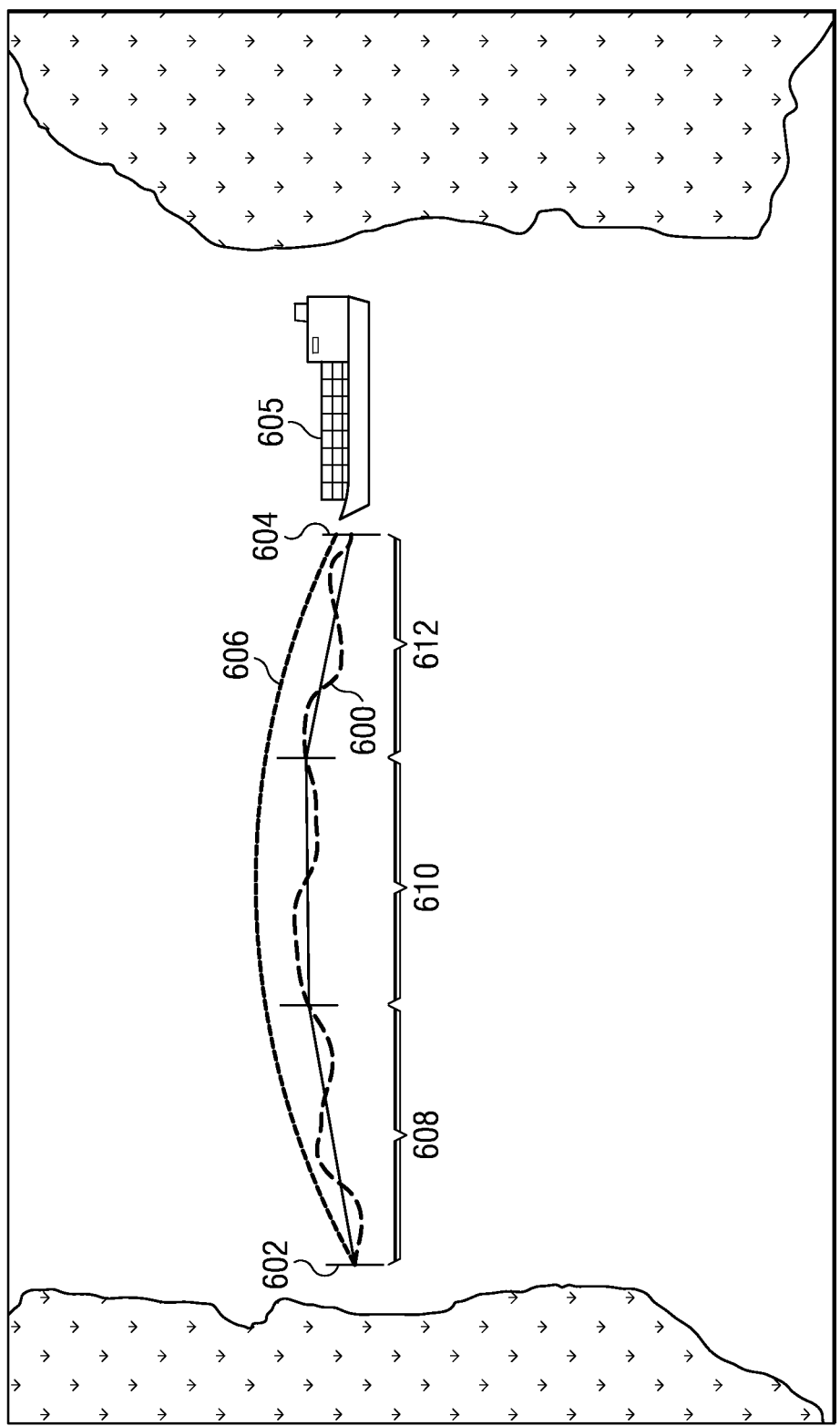
FIG. 6 is a diagram illustrating routes for voyage solutions in accordance with an advantageous embodiment.

With reference now to FIG. 6, a diagram illustrating routes for voyage solutions is depicted in accordance with an advantageous embodiment. In this example, route 600 may be a ship voyage between origination 602 and destination 604 for ship 605. Route 600 is a voyage that has actually completed. Route 606 is the sum of segments 608, 610, and 612 and may be a baseline voyage solution generated using historical data for the completed voyage using route 600. This historical data may be, for example, historical data 304 in FIG. 3.

In calculating route 606, the route may be divided into shorter segments, such as segments 608, 610, and 612, for analysis. Each segment may be analyzed to identify voyage efficiency for a particular set of parameters such as, for example, without limitation, fuel consumption, while maintaining on-time arrival. Actual operating efficiency for route 600 may then be compared to the baseline efficiency for route 606.

In other advantageous embodiments, the efficiency of each voyage segment may be calculated. For example, each segment of the baseline voyage solution for a completed voyage may be compared to a corresponding segment in the actual voyage solution used for the completed voyage. The total voyage efficiency over the entire route may be calculated by combining the efficiencies of each voyage segment.

Figure 7:
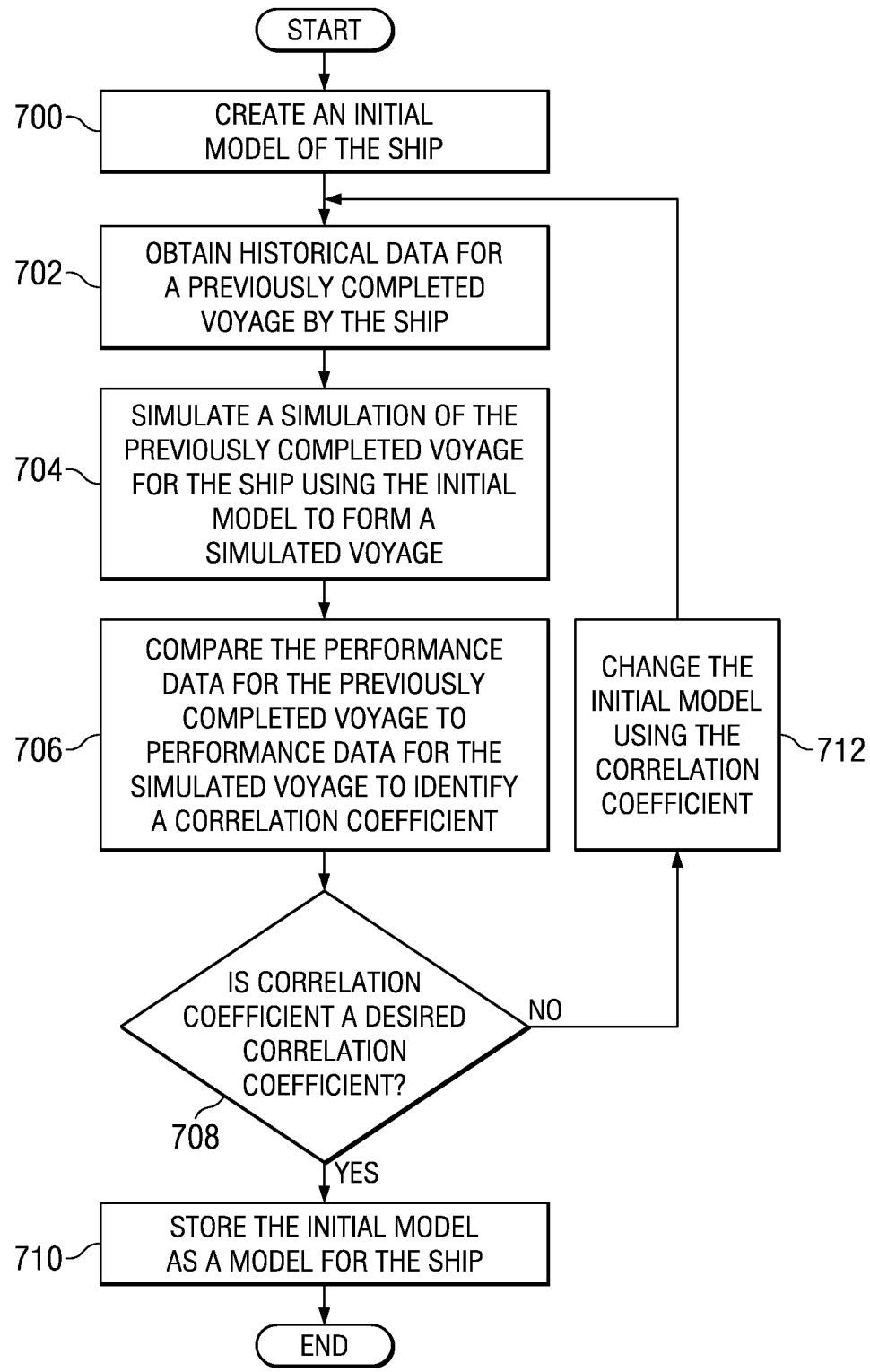
FIG. 7 is a flowchart of a process for analyzing voyage efficiency in accordance with an advantageous embodiment.

With reference now to FIG. 7, a flowchart of a process for analyzing voyage efficiency is depicted in accordance with an advantageous embodiment. The process illustrated in FIG. 7 may be implemented in a process such as, for example, model creation process 201 in FIG. 2. Model creation process 201 may be a software component. In some advantageous embodiments, model creation process 201 may include operations performed by users or designers.

The process begins by creating an initial model of the ship (operation 700). The process then obtains historical data for a previously completed voyage by the ship (operation 702).

Next, a simulation of the previously completed voyage for the ship is simulated using the initial model to form a simulated voyage (operation 704). The performance data for the previously completed voyage is compared to performance data for the simulated voyage to identify a correlation coefficient (operation 706).

A determination is then made as to whether the correlation coefficient is a desired correlation coefficient (operation 708). If the correlation coefficient is a desired value, the process then stores the initial model as a model for the ship (operation 710), with the process terminating thereafter. This model may be used for generating voyage solutions and making comparisons between routing processes.

With reference again to operation 708, if the correlation coefficient does not have a desired value, the process changes the initial model using the correlation coefficient (operation 712). Other possible changes to the model include, for example, the addition of missing data, the correction of erroneous data, the adding or modifying of model parameters, the providing of additional actual recorded voyage data, and interfacing with specialized sensors and/or other shipboard instrumentation.

Current data is the tidal and/or major ocean current directions, routes, and velocities. This data is obtained from sources other than the weather and/or hindcast data. Recorded voyage data is the route, speed, direction, departure time, arrival time, load, draft, trim, fuel consumption, engine speed, engine revolutions per minute, horsepower, and other relevant data associated with a voyage that has been, or is in the process of being, completed. The process then returns to operation 702 to perform additional simulations.

Figure 8:
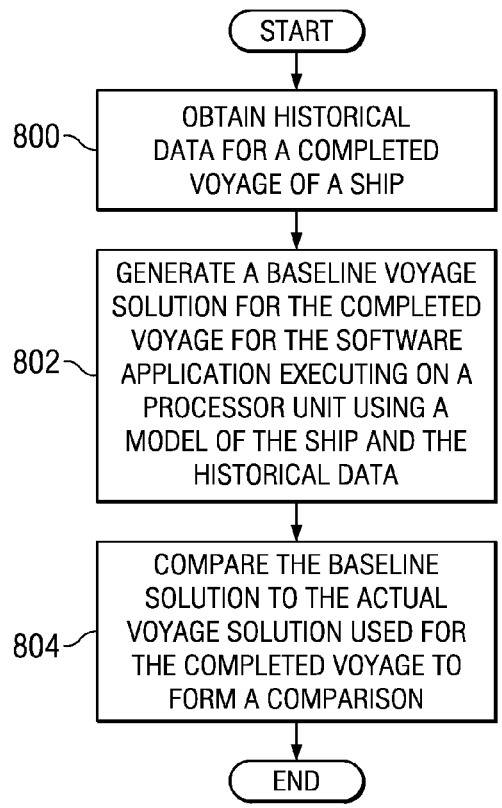
FIG. 8 is a flowchart of a process for analyzing voyage efficiency in accordance with an advantageous embodiment.

With reference now to FIG. 8, a flowchart of a process for analyzing voyage efficiency is depicted in accordance with an advantageous embodiment. The process illustrated in FIG. 8 may be implemented in a process such as, for example, analysis process 302 in FIG. 3. The process may include software and/or user implemented operations.

The process begins by obtaining historical data for a completed voyage of a ship (operation 800). The process then generates a baseline voyage solution for the completed voyage for the software application executing on a processor unit using a model of the ship and the historical data (operation 802). The process then compares the baseline solution to an actual voyage solution used for the completed voyage to form a comparison (operation 804), with the process terminating thereafter.

Figure 9:
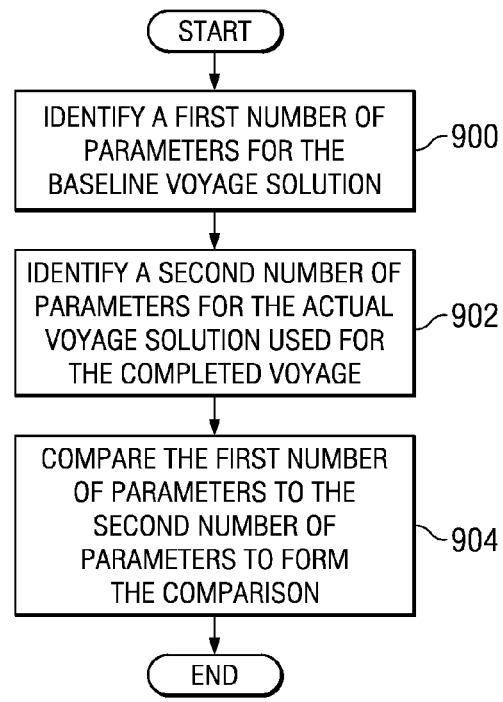
FIG. 9 is a flowchart of a process for comparing voyage solutions in accordance with an advantageous embodiment.

With reference now to FIG. 9, a flowchart of a process for comparing voyage solutions is depicted in accordance with an advantageous embodiment. The process illustrated in FIG. 9 is a more detailed illustration of operation 804 in FIG. 8.

The process begins by identifying a first number of parameters for the baseline voyage solution (operation 900). This first number of parameters is a number of parameters of interest. For example, without limitation, the first number of parameters may be fuel consumption. The process then identifies a second number of parameters for the actual voyage solution used for the completed voyage (operation 902). The process then compares the first number of parameters to the second number of parameters to form the comparison (operation 904). The comparison may include identifying a difference between the first number of parameters and the second number of parameters to form the comparison expressed as a percentage. The process terminates thereafter.

Figure 10:
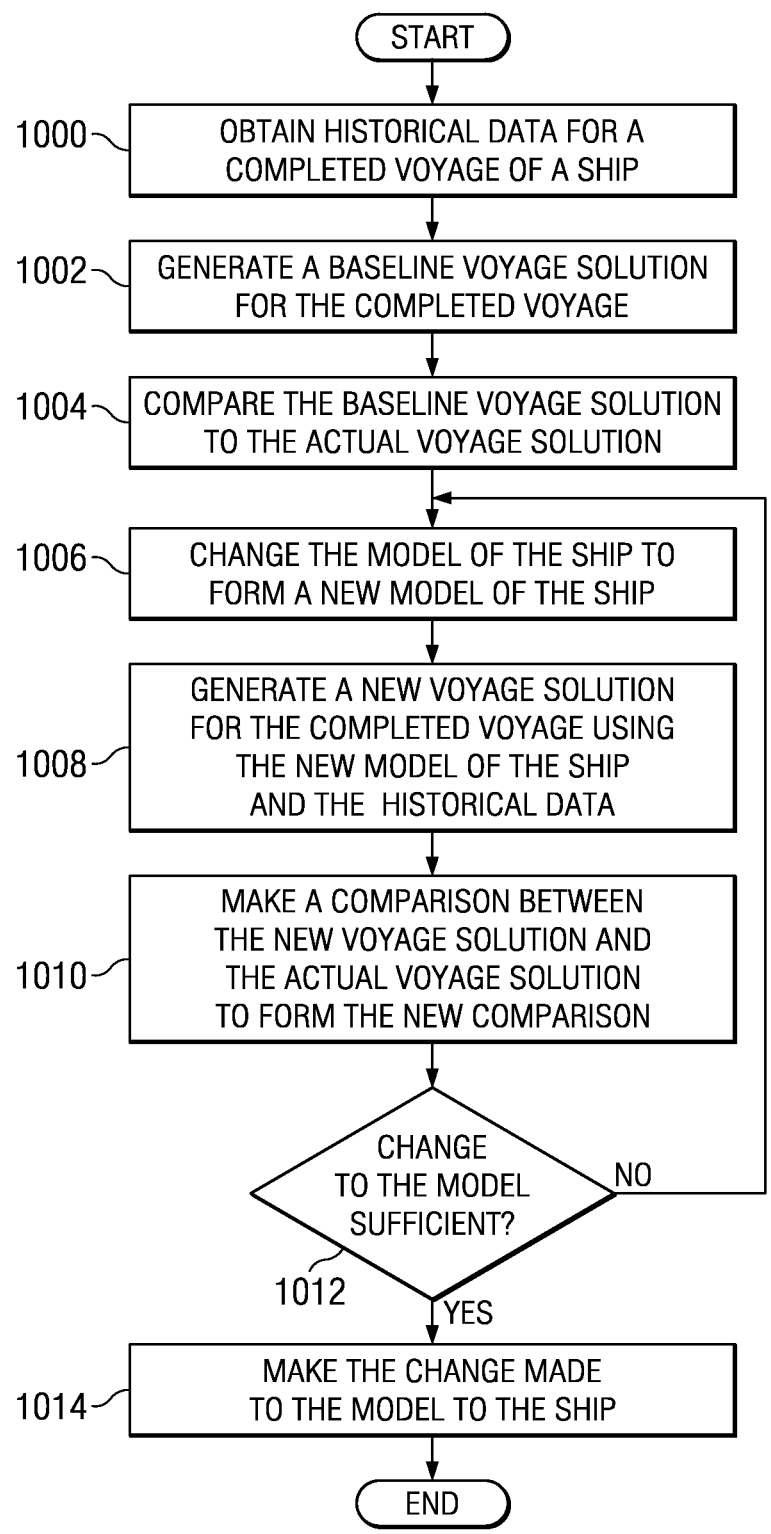
FIG. 10 is a flowchart of a process for identifying modifications to a ship to increase ship performance in accordance with an advantageous embodiment.

With reference now to FIG. 10, a flowchart of a process for identifying modifications to a ship to increase ship performance is depicted in accordance with an advantageous embodiment. The process illustrated in FIG. 10 may be implemented using a process such as, for example, analysis process 302 in FIG. 3. This process may take the form of software and/or user implemented operations.

The process illustrated in FIG. 10 begins by obtaining historical data for a completed voyage of a ship (operation 1000). The process then generates a baseline voyage solution for the completed voyage (operation 1002). The process then compares the baseline voyage solution to the actual voyage solution (operation 1004).

The process then changes the model of the ship to form a new model of the ship (operation 1006). A new voyage solution is then generated for the completed voyage using the new model of the ship and the historical data (operation 1008). A comparison is made between the new voyage solution and the actual voyage solution to form the new comparison (operation 1010).

A determination is made as to whether the change to the model is sufficient (operation 1012). If the change to the model is insufficient, the process may then return to operation 1006. If the change to the model is sufficient, the change made to the model may be made to the ship (operation 1014), with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

The blocks also may include user implemented operations when appropriate. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In this manner, one or more of the different advantageous embodiments may be used to identify improvements to the ship. These improvements may include, for example, painting the hull of the ship, cleaning the hull of the ship, polishing propellers, changing propellers, performing maintenance on an engine, modifying auto pilot, stabilizing fin function, and/or other relevant processes.

Further, as previously mentioned, the different advantageous embodiments may be used to compare different software applications to identify one or more applications that may provide some desired level of performance. A software application may have one or more of the functions identified in the blocks or described previously in the various embodiments. Comparisons of a voyage solution from a first ship may be analyzed with comparisons of voyage solutions from a number of ships to determine whether a software application is more accurate than a number of other software applications.

For example, the processor may execute program code to obtain first historical data for a first completed voyage of a first ship and generate a first baseline voyage solution for the first completed voyage. The first baseline voyage solution is generated with a first software application using a first model of the first ship and first historical data. A first comparison for the first ship is formed by comparing the first baseline voyage solution to a first actual voyage solution used for the first completed voyage.

The processor further executes program code to obtain historical data for a number of completed voyages for a number of ships and generates a number of baseline voyage solutions for the number of completed voyages. The number of baseline voyage solutions are generated using a number of software applications using a number of models of the number of ships and the number of historical data. A number of comparisons are formed by comparing the number of baseline voyage solutions to a number of corresponding actual voyage solutions used for the number of completed voyages. Finally, the first comparison and the number of comparisons are analyzed to identify which one of the first software application and the number of software applications is more accurate.

Further still, the different advantageous embodiments also may be used to identify when a model of a ship and the ship diverge in performance. This divergence may be used to identify changes that may have occurred to the ship during use that may not be reflected in the model. For example, over time, the paint on the hull of a ship may deteriorate. This deterioration may result in the actual voyages diverging from the voyage solution generated by a routing process. By using one or more of the different advantageous embodiments to make comparisons to completed voyages, a divergence that occurs over time between the voyage solution and the actual results may be used to indicate that updates to the model and/or maintenance may need to be performed to the ship.

Further, the different advantageous embodiments also may be used to establish a baseline for emissions from fuel combustion, such as carbon dioxide and other greenhouse gases (GHG). Carbon emissions from combustion of petroleum-based fuel are directly proportional to fuel consumption. This emission index may then be used to monitor, record, and/or certify changes of greenhouse gases emission quantities for the purposes of meeting operating regulations and/or carbon credit trading.

Thus, the different advantageous embodiments provide a method and apparatus for analyzing voyage efficiency. One or more of the different advantageous embodiments provide a capability to compare different routing processes to identify whether a particular routing process may generate better routing solutions. The different advantageous embodiments generate comparisons by identifying differences between efficiencies or other parameters using a model and historical data for a completed voyage.

In the different advantageous embodiments, one of the parameters that may be compared and benchmarked is fuel consumption. The different advantageous embodiments provide a capability to compare optimum fuel consumption with actual fuel consumption. The different advantageous embodiments, as described above, may recreate an actual ship voyage using recorded data and then find an optimized solution using a routing process. The comparison of the actual voyage or voyage solution is compared with the solution made by the routing process.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by, or in connection with, a computer or any device or system that executes instructions. For the purposes of this disclosure, a computer usable or computer readable medium can generally be any tangible apparatus that can contain, store, communicate, propagate, or transport the program for use by, or in connection with, the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for analyzing voyage efficiency, the method comprising:
    creating an initial model of a ship, the initial model configured to perform simulations and generate voyage solutions for the ship on an ocean, the initial model incorporating detailed ship-specific data;
    obtaining historical data for a completed voyage of the ship on the ocean, historical data including at least weather and ocean information;
    simulating the previously completed voyage for the ship using the initial model to form a simulated voyage;
    comparing performance data for the previously completed voyage to performance data for the simulated voyage to identify a correlation coefficient comprising at least a propeller wake factor;
    changing the initial model using the correlation coefficient to generate a changed initial model;
    generating a baseline voyage solution by a processor for the completed voyage with a software application executing on a processor unit using the changed initial model of the ship and the historical data;
    generating an actual voyage solution for the ship;
    identifying a first number of parameters generated for the baseline voyage solution;
    identifying a second number of parameters generated for the actual voyage solution used for the completed voyage;
    comparing on the processor the first number of parameters to the second number of parameters to form a comparison, including comparing each segment in a plurality of segments in the baseline voyage solution for the completed voyage to a corresponding segment in a plurality of segments in the actual voyage solution used for the completed voyage to form the comparison in order to determine the voyage efficiency, the comparing identifying a correlation coefficient between the baseline voyage solution and the actual voyage solution comprising a propeller wake factor, and the comparing including identifying a difference between the first number of parameters the second number of parameters to form the comparison expressed as a percentage;
    adjusting the changed initial model with the correlation coefficient to match an actual recorded ship performance, including fuel efficiency, speed, and probability of arriving on time at the destination, to form an adjusted model; and
    generating a new voyage solution based on the comparison and the adjusted model.

2. The method of claim 1, wherein the ship is a first ship, the historical data is the historical data for the first ship, the completed voyage is a first completed voyage, the baseline voyage solution is a first baseline voyage solution for the first ship, the software application is a first software application, the model is the first model of the first ship, the actual voyage solution is the actual voyage solution for the first ship, and the comparison is a first comparison for the first ship and further comprising:
    obtaining the historical data for a number of completed voyages for a number of ships;
    generating a number of baseline voyage solutions for the number of completed voyages with a number of software applications using a number of models of the number of ships and the historical data;
    comparing the number of baseline voyage solutions to a number of corresponding actual voyage solutions used for the number of completed voyages to form a number of comparisons; and
    analyzing the first comparison and the number of comparisons to identify which one of the first software applications and the number of the software applications is more accurate.

3. The method of claim 1 further comprising:
    repeating the steps of simulating the previously completed voyage for the ship using the initial model to form a simulated voyage solution; comparing the performance data for the previously completed voyage to performance data for the simulated voyage to identify the correlation coefficient; and calibrating the initial model using the correlation coefficient until a desired correlation coefficient is obtained to form the model of the ship.

4. The method of claim 1 further comprising:
changing the model of the ship to form a new model of the ship based on the correlation coefficient;
wherein generating a new voyage solution comprises a new voyage solution for the completed voyage with a software application executing on a processor unit using the new model of the ship and the historical data;
adjusting the correlation coefficient for modifications made to the ship hull design, changes in hull or propeller roughness, fuel quality, or use of different hull coating materials; and
comparing the new voyage solution to the actual voyage solution used for the completed voyage to form a new comparison.

5. The method of claim 4 further comprising:
making a change to the ship based on the change to the model of the ship if the new comparison provides better performance than the comparison.

6. The method of claim 5, wherein the performance is selected from at least one of fuel efficiency, speed, and a probability of arriving on time at a destination.

7. The method of claim 5, wherein the change to the ship is selected from at least one of painting a hull of the ship, cleaning the hull of the ship, polishing a number of propellers for the ship, adding a number of new propellers for the ship, and modifying the hull.

8. The method of claim 4 further comprising: adjusting the correlation coefficient for missing or erroneous data; and adjusting the correlation coefficient when additional data is collected for the ship performance after maintenance or repair.

9. The method of claim 1, wherein the model of the ship includes at least one of a ship hull design, a number of engine power characteristics, a number of propeller curves, ship draft, and a number of safe operating limits.

10. The method of claim 1, wherein the historical data comprises at least one of wind, wave height, current, and temperature.

11. The method of claim 1, wherein voyage efficiency is fuel consumption for the baseline voyage solution divided by actual fuel consumption for each individual segment of the completed voyage.

12. The method of claim 1, further comprising generating a second correlation coefficients to adjust for hull roughness.

13. The method of claim 12 further comprising generating a plurality of correlation coefficients to adjust for differences in draft, differences in trim, modifications to ship, engine tune, and fuel quality.

14. The method of claim 1, wherein the detailed ship specific data includes ship hull shape, appendages, engine power characteristics, propeller curves, see-keeping models, safe operating limits, ship draft, and trim.

15. A data processing system comprising:
a storage device, wherein the storage device includes program code; and
a processor unit in communication with the storage device, wherein the processor unit is capable of executing the program code to create an initial model of a ship, the initial model configured to perform simulations and generate voyage solutions for the ship on an ocean, the initial model incorporating detailed ship-specific data; obtain historical data for a completed voyage of the ship, historical data including at least weather and ocean information; generate a baseline voyage solution for the completed voyage with a software application executing on a processor unit using a model of the ship and the historical data; generate an actual voyage solution for the ship; identify a first number of parameters generated for the baseline voyage solution; identify a second number of parameters generated for the actual voyage solution used for the completed voyage; and compare the first number of parameters to the second number of parameters to form a comparison, including comparing each segment in a plurality of segments in the baseline voyage solution for the completed voyage to a corresponding segment in a plurality of segments in the actual voyage solution used for the completed voyage to form the comparison in order to determine the voyage efficiency, the comparing identifying a correlation coefficient between the baseline voyage solution and the actual voyage solution comprising a propeller wake factor, and the comparing including identifying a difference between the first number of parameters the second number of parameters to form the comparison expressed as a percentage; adjust the initial model with the correlation coefficient to match the actual recorded ship performance, including at least one of fuel efficiency, speed, and probability of arriving on time at the destination, to form an adjusted model; and generate a new voyage solution based on the comparison and the adjusted model.

16. The data processing system of claim 15, wherein the ship is a first ship, historical data is the historical data for the first ship, the completed voyage is a first completed voyage, the baseline voyage solution is a first baseline voyage solution for the first ship, the software application is a first software application, the model is a first model of the first ship, and the comparison is a first comparison for the first ship and wherein the processor unit further executes the program code to obtain historical data for a number of completed voyages for a number of ships; generate a number of baseline voyage solutions for the number of completed voyages with a number of software applications using a number of models of the number of ships and the historical data; compare the number of baseline voyage solutions to a number of corresponding actual voyage solutions used for the number of completed voyages to form a number of comparisons; and analyze the first comparison and the number of comparisons to identify which one of the first software application and the number of software applications is more accurate.

17. A non-transitory computer program product for analyzing voyage efficiency, the computer program product comprising:
a computer recordable storage medium;
program code, stored on the computer recordable storage medium, for creating an initial model of a ship, the initial model configured to perform simulations and generate voyage solutions for the ship on an ocean, the initial model incorporating detailed ship specific data;
program code, stored on the computer recordable storage medium, for obtaining historical data for a completed voyage of the ship, historical data including at least weather and ocean information;
program code, stored on the computer recordable storage medium, for generating a baseline voyage solution for the completed voyage with a software application executing on a processor unit using a model of the ship and the historical data;
program code, stored on the computer recordable storage medium, for generating an actual voyage solution for the ship;

program code, stored on the computer recordable storage medium, for identifying a first number of parameters generated for the baseline voyage solution; identifying a second number of parameters generated for the actual voyage solution used for the completed voyage; and comparing the first number of parameters to the second number of parameters to form a comparison, including comparing each segment in a plurality of segments in the baseline voyage solution for the completed voyage to a corresponding segment in a plurality of segments in the actual voyage solution used for the completed voyage to form the comparison in order to determine the voyage efficiency, the comparing identifying a correlation coefficient between the baseline voyage solution and the actual voyage solution comprising a propeller wake factor, and the comparing including identifying a difference between the first number of parameters the second number of parameters to form the comparison expressed as a percentage;

program code, stored on the computer recordable storage medium, for adjusting the initial model with the correlation coefficient to match the actual recorded ship performance, including at least one of fuel efficiency, speed, and probability of arriving on time at the destination, to form an adjusted model; and program code, stored on the computer recordable storage medium, for generating a new voyage solution based on the comparison and the adjusted model.

* * * * *